United States Patent [19]

Verhoef et al.

[11] Patent Number: 4,935,251

[45] Date of Patent: Jun. 19, 1990

[54] FOOD PRODUCT

[75] Inventors: Nicolaas J. F. D. Verhoef, Maasland; Hendrik F. Zock, Barendrecht, both of Netherlands

[73] Assignee: Thomas J. Lipton Inc., Englewood Cliffs, N.J.

[21] Appl. No.: 168,861

[22] Filed: Mar. 16, 1988

[30] Foreign Application Priority Data

Mar. 16, 1987 [NL] Netherlands .................. 8700616

[51] Int. Cl.$^5$ ............................................ A21D 13/00
[52] U.S. Cl. ...................... 426/94; 426/302; 426/439; 426/440; 426/446; 426/496; 426/497; 426/549; 426/560; 426/589
[58] Field of Search ............... 426/94, 96, 302, 439, 426/440, 446, 496, 497, 547, 560, 589

[56] References Cited

U.S. PATENT DOCUMENTS

| 3,088,829 | 5/1963 | Rapaport | 426/94 |
| 3,484,250 | 12/1969 | Vollink et al. | 426/96 |
| 3,666,491 | 5/1972 | Touba | 426/96 |
| 3,830,941 | 8/1974 | Luft et al. | 426/94 |
| 4,038,422 | 7/1977 | Keyser et al. | 426/94 |
| 4,066,796 | 1/1978 | McKee | 426/94 |
| 4,285,979 | 8/1981 | Izzi | 426/94 |
| 4,562,079 | 12/1985 | Herzing | 426/94 |
| 4,588,596 | 5/1986 | Bone et al. | 426/290 |
| 4,762,721 | 8/1988 | Holscher et al. | 426/94 |

FOREIGN PATENT DOCUMENTS

| 60-137242 | 7/1985 | Japan . |
| 2015315 | 1/1979 | United Kingdom . |
| 2176089 | 12/1986 | United Kingdom . |
| 2177585 | 1/1987 | United Kingdom . |

*Primary Examiner*—Peter Chin
*Attorney, Agent, or Firm*—Brumbaugh, Graves, Donohue & Raymond

[57] ABSTRACT

Process for preparing a foodstuff product such as croûtons, characterized in that pieces of dough are at least partially baked and thereby expanded, whereafter the expanded pieces of foodstuff obtained are possibly further reduced in size and subsequently provided with a thermosetting coating layer, which coating layer comprises a film-forming material.

Preferably, the coated pieces of foodstuff are subjected to a heat treatment. Preferably, a film-forming material rich in protein is used.

9 Claims, No Drawings

FOOD PRODUCT

The invention relates to a process for preparing a food product, such as croûtons, and more in particular to a process for preparing such food products which can have a low fat content and a reduced moisture absorption rate.

In this application and related claims, by baking is understood the process in which, under the influence of heat, a certain firmness is given to pieces of dough. Useful baking processes are, for instance, baking in a conventional radiation and/or convection oven, cooking, treatment with microwaves, steaming, high pressure extrusion and heating on a rotating drum. During baking. decrease of the moisture content and/or expansion can occur. By partially baking is understood the process in which no maximum loss of moisture and/or expansion occurs.

In this application, by coating layer is understood a coating of the product which does not extend into the whole product but remains restricted to the strip close to the surface. By a thermosetting coating layer is understood a coating layer which, under the influence of heat, such as, for instance, in the above-mentioned baking processes, forms a moisture-proof layer around the product. Here, by heat treatment is understood any supply of heat to the product which can bring about such a process.

If in this application reference is made to water content, what is meant here is the total amount of water in the composition, both added and bound, unless indicated otherwise. The percentages of the other ingredients refer to the amount of dry material of these ingredients in relation to the whole composition, including water.

By a dough is understood a visco-elastic material comprising water, starch and protein. Generally speaking, doughs comprise a fully or substantially fully continuous protein matrix.

An already known process for preparing croûtons is concerned with baking bread from bread dough, during which expansion of the dough occurs, after which the bread is allowed to dry, cut into small pieces and the pieces thus obtained are deep-fried. This process has the disadvantage that the croûtons thus obtained usually have a relatively high fat content; a second disadvantage is the quick hydration of the croûtons after they have been introduced into an aqueous solution, such as, for instance, soup, as a result of which the croûtons quickly lose their crispness. This loss in crispness quickly increases with increasing temperature. A third disadvantage is concerned with the considerable losses in weight occurring during the cutting of dried bread into pieces.

A second known process for preparing croûtons as described in GB 2177585 comprises coating standard croûtons with a liquid or powdered coating material for improving the taste or the appearance. However, croûtons obtained according to this process also show quick hydration in an aqueous solution, such as soup.

It has now been found that the above-mentioned disadvantages can be avoided by using a process for preparing a food product, such as croûtons, which process according to the invention is characterized in that pieces of dough are at least partially backed and thereby expanded, whereafter the expanded pieces of foodstuff obtained are optionally further reduced in size and are subsequently provided with a thermosetting coating layer, which coating layer comprises a film-forming material. Preferably, the water content of the coated product is less than 25%, more preferably less than 15%.

During baking it is important that the expanded pieces of dough get a certain firmness so that, on further treatment, they do not lose their porous structure. Such firmness can, for instance, be acquired because, during baking, a crust is formed around the product or because, after baking, the structure of the product is sufficiently firm.

If the expanded pieces of foodstuff are obtained by baking at elevated pressure by means of extrusion with the aid of a so-called "cooker-extruder", it is preferred that the dough containing from 8 to 40 wt.% water as well as a vegetable fraction that is rich in starch, such as, for instance, flour or meal derived from cereals, seeds, turnips or carrots and other desired components, be extruded at elevated temperature and pressure, such that a temperature of 130° C. is not exceeded.

The high pressure in the extruder, in combination with the elevated temperature, brings about quick evaporation of part of the water from the dough at the moment of extrusion, causing the dough to expand. The extrusion is carried out at a temperature and pressure such that, on the one hand, a product is obtained that is sufficiently gelatinized to form a coherent whole, while, on the other hand, formation of slimy end-products is avoided.

The extrusion is generally carried out at a pressure such that the temperature of the product on leaving the extruder is between 50° and 130° C., preferably between 80° and 100° C. At the product temperature of 80° to 100° C., which is preferably used, the pressure applied is usually 30–60 bar. Preferably, here the shearing conditions in the extruder are chosen such that a considerable part, preferably more than 75% of the starch grains, is not disintegrated.

After extrusion, the product obtained is divided into pieces of the desired size. Optimum expansion is obtained when the starch in the vegetable fraction rich in starch in the dough to be extruded consists for at least 35% of amylose; particularly preferred is an amylose content of more than 40%.

By adding a minor amount (up to 2 wt.% of the dough, preferably up to about 0.5 wt.%) of an amylose- or starch-complexing agent, such as, for instance, a mono/diglyceride of a fatty acid having 12 to 24 carbon atoms or a fatty acid-n-lactic acid condensate, the fatty acid having 12 to 24 carbon atoms and an n-value between 1 and 5, or a sodium, potassium or calcium salt thereof, additional firmness is given to the end-product. The desired amylose content can, for instance, be obtained by using a vegetable fraction rich in starch containing a high content of amylose or by adding crystalline amylose to the dough.

When the expanded products are obtained by baking dough in a conventional radiation and/or convection oven, the starting material can be a dough containing from 15 to 50 wt.% water as well as a vegetable fraction rich in starch and other desired components. The pieces formed from the dough are preferably baked for 5 to 35 minutes at a temperature of 160° to 240° C.

Preferably, after baking, the pieces of foodstuff are subsequently dried for 2–180 minutes at a temperature of 70°–130° C.

When the expanded products are obtained by microwave heating of dough, it is preferred here that the dough containing water, a vegetable fraction rich in starch, and other components, in which the total water content is 15–50 wt.%, be heated in a microwave oven for 100–1,000 s at an emissivity of 400–800 watt.

Preferably, the conditions of preparing the dough to be baked in a conventional convection and/or radiation oven or microwave oven are chosen such that a substantial part, more than 75% of the starch grains, is not disintegrated.

Preferably, the dough contains a leavening agent. Leavening agents that can be used are, for instance, yeast and/or baking powders; optionally, at elevated pressure, gas can also be introduced into the dough or the leavening caused to occur by water evaporating from the product.

Especially tasty food products are obtained by using puff pastry or cracker dough.

When preparing the dough, preferably use is made of vegetable fractions rich in starch from cereals, such as, for instance, wheat, barley, rye etc. or mixtures of these cereals or other raw materials that are rich in starch. Preferably, more than 50% of the vegetable fraction rich in starch comes from wheat. Using wheat flour as vegetable fraction rich in starch is very advantageous. Additional ingredients, such as edible fibre materials, vegetable or animal proteins, proteins obtained by fermentation, edible oils or fats or fat replacers, salt, colouring agents, antioxidants, herbs, spices, cheese, emulsifiers, vitamins, preservatives and flavouring materials or flavour precursors can be added to the dough from which the expanded pieces of foodstuff are obtained.

Generally, up to about 25 wt.% edible fibre materials and 3 to 25 wt.% oil or fat are used, but for special products these percentages can possibly be increased. In some cases, cheese and/or meat can also be used as source of protein and fat. Adding caseinate to the dough improves the crispness of the end-product.

It is also possible to prepare products of several layers having a different composition or to incorporate a filling in the expanded product.

If it is desired that the products obtained by the process of the present invention remain floating, it is preferred that the expanded pieces of foodstuffs have a specific volume of $(1.2$ to $3.0) \times 10^{-3}$ m$^3$/kg. A lower specific volume is not desirable because, after absorption of water, the products can still sink; a higher specific volume can result in porous products that lose their crispness undesirably quickly in aqueous solutions. A specific volume of $(1.5$ to $2.3) \times 10^{-3}$ m$^3$/kg is particularly preferred.

After the at least partially baked, expanded products have been formed, they are provided with a thermosetting protective layer, which coating layer comprises a film-forming material. This can, for instance, be effected by immersing the expanded products in a coating composition or spraying such a coating composition on to the expanded products while these are moving, or by "dragée formation".

If the product is deep-fried, the coating ensures that, upon deep-frying, oil can penetrate the porous product to a lesser extent but that, at the same time, part of the remaining moisture can leave the product in the form of vapour. The film of moisture then presumably comes to lie around the product, thus forming an additional bar to penetration of deep-frying oil.

The coating should adhere well to the base and, after heating, form a closed, coherent layer thereon. The composition of the coating layer can be varied widely. The amount of film-forming material is preferably 1–10 wt.%. Preferably, a film-forming material rich in protein is used, such as chicken protein, gelatin, whey, milk solids non fat, caseinate etc.

Though not belonging to the preferred group, it is also possible to use other film-forming materials, such as various gums, alkyl celluloses etc.

Preferably, the film-forming material is used in suspension or emulsion.

Preferably, the coating composition is used in the form of a water and oil emulsion, particularly a water-in-oil emulsion. Here, from 40 to 60 wt.% oil or fat, from 40 to 60 wt.% water, from 1 to 10 wt.% film-forming material (excluding water) and up to 5 wt.% emulsifiers, salt, flavouring materials and similar additives are used. when a batter or the oil and water type coating is used, preferably 20–60 wt.% water, 5–35 wt.% flour, 1–10 wt.% film-forming material, 10–30 wt.% fat and up to 5 wt.% emulsifiers, salt, flavouring materials and similar additives are added.

The amount of coating material is preferably less than 35 wt.%, calculated on the whole product. Preferably, the coated pieces of foodstuff have a volume of less than 8 cm$^3$, particularly preferably less than 4 cm$^3$.

After application of the coating layer, the at least partially baked, expanded pieces of foodstuff are subjected to a heat treatment, such as, for instance, a deep-frying, baking or microwave treatment. Deep-frying preferably takes place at a temperature of 150° to 220° C., particularly preferably from 180°–200° C., for 10–200 seconds. Baking preferably takes place for 5–20 minutes at a temperature of 150° to 250° C. in a conventional radiation and/or convection oven. Heating in a microwave oven preferably takes place for 10–1,000 seconds at an emissivity of 400–800 watt.

Foodstuffs obtained according to a process of the invention preferably comprise a porous, baked core having a volume of less than 4 cm$^3$ and a specific volume of $(1.2$ to $3.0) \times 10^{-3}$ m$^3$/kg coated with a moisture-proof coating layer comprising more than 20 wt.% fat and more than 1 wt.% of a film-forming material. Preferably, the coating layer is hardened under the influence of heat.

Although the invention can be applied with particular success for the preparation of croûtons, it is by no means restricted thereto. By the process according to the present invention snack products, cereal products for use in breakfast compositions etc. can be prepared as well.

The invention will now be further illustrated by the following Examples which, however, in no way limit the scope of the invention.

EXAMPLE I

Preparation of croûtons from bread according to the invention

A dough was prepared from:
1,000 g wheat flour, of which 14% water, 12% protein and 73% starch
500 g added water
15 g pressed yeast
15 g salt.

The total water content of the dough was 42 wt.%; the total starch content was 48 wt.%. Broad was baked from this dough in a known manner in a conventional oven. The bread thus obtained was cooled, cut into lumps of 15 mm×15 mm×15 mm and dried for 40 minutes at 110° C. The dried pieces of bread thus obtained had a specific volume of $2.0 \times 10^{-3}$ m$^3$/kg and a water content of 4 wt.%.

A coating material was prepared from:
49.2 g chicken protein consisting of 43.8 g water and 5.4 g dry protein
49.2 g sunflower oil
1.4 g salt
0.3 g lecithin.

The total water content of the coating material was 44 wt.%; the total fat content was 49 wt.%.

The dried pieces of bread were coated with this coating material. The weight ratio of coating material to dried pieces of bread was 1:3. The water content of the coated product was 14 wt.%. The coated pieces of bread were subsequently deep-fried for 30 s at 175° C. The product thus obtained contained 20 wt.% fat and retained its crispness for 5 minutes in soup of 75° C.

EXAMPLE 2

Comparative example

For comparison, croûtons were prepared from bread according to the already known method. For this purpose, the dried pieces of bread, which had been obtained as in Example 1, were deep-fried without coating for 20 s at 175° C. The product thus obtained contained 40 wt.% fat and lost its crispness within 2 minutes in soup of 75° C.

EXAMPLE 3

Preparation of croûtons according to the invention sheeted dough

A dough was prepared from:
1,000 g wheat flour, of which 12% water, 13% protein and 74% starch
425 g added water
9 g baking powder (a mixture of ammonium bicarbonate and sodium bicarbonate)
20 g salt
150 g sunflower oil.

The total water content of the dough was 34 wt.%; the total starch content was 46 wt.%. The dough was allowed to stand for 10 minutes and subsequently rolled out to a layer having a thickness of 3 mm. The sheeted piece of dough was divided into pieces of 9 mm×9 mm and these pieces were baked in an electric oven for 20 minutes at 200° C. and thereafter dried for 90 minutes at 80° C. The specific volume of the baked products thus obtained was $2.0 \times 10^{-3}$ m$^3$/kg, the moisture content was 4 wt.% and the dimensions of the baked products were 8 mm×8 mm×8 mm. The products thus obtained were coated with the coating material as described in Example 1. The weight ratio of coating material to baked product was 1:3. The water content of the coated product was 14 wt.%. The coated products were deep-fried for 25 s at 180° C. The croûtons thus obtained contained 27 wt.% fat and retained their crispness for 8 minutes in soup of 75° C. and for 3 minutes in soup of 100° C.

EXAMPLE 4

Preparation of croûtons according to the invention from sheeted dough provided with a double coating layer The deep-fried croûtons obtained according to Example 3 were provided with a second coating layer having the same composition as the first coating layer. The weight ratio of second coating layer to single coated, deep-fried croûton was 1:5. The water content of the doubly coated croûton was 10 wt.%. The coated croûtons were subsequently deep-fried again for 25 s at 180° C. The croûtons obtained contained 38 wt.% and retained their crispness for 12 minutes in soup of 75° C. and for 5 minutes in soup of 100° C.

EXAMPLE 5

Preparation of a snack according to the invention from sheeted dough

A dough was prepared from
1,000 g wheat flour (12% water, 13% protein, 74% starch)
500 g water
9 g baking powder (a mixture of ammonium bicarbonate and sodium bicarbonate)
20 g salt.

The total water content of the dough was 40 wt.%, the total starch content was 48 wt.%. The dough was allowed to stand for 10 minutes and subsequently rolled out to a layer having a thickness of 3 mm.

The sheeted dough was divided into pieces of 25 mm×25 mm and baked in an electric oven for 25 minutes at 200° C. and thereafter dried for 100 minutes at 90° C. The moisture content was 4 wt.%, the specific volume $2.0 \times 10^{-3}$ m$^3$/kg and the dimensions of the pieces were 25 mm×25 mm×8 mm.

A coating material was prepared from:
500 g what flour, of which 14% water, 12% protein and 73% starch
650 g peanut oil
1,100 g chicken protein, of which 88% water and 12% protein
350 g added water
30 g salt.

The baked, subsequently dried products were coated with the coating material, the weight ratio of coating material to baked product being 1:3. The water content of the coated product was 17 wt.%. The coated products were deep-fried for 25 є at 180° C. The fat content of the end-product was 11.0 wt.%.

When exposed to the air, the products remained fresh longer than non-coated snacks.

EXAMPLE 6

Preparation of croûtons according to the invention from wholemeal puff pastry

A puff pastry was prepared from a dough consisting of:
1,000 g wheat flour, of which 14% protein, 14% water and 71% starch
500 g added water
10 g salt
which was rolled out and folded four times with 700 g puff pastry margarine (16% water, 84% fat) admixed with 300 g commercial wheat bran (of which 15 wt.% water). The total water content of the dough was 33 wt.%. The puff pastry was rolled out to a thickness of 3 mm and divided into pieces of 9 mm×9 mm. The pieces of puff pastry thus obtained where baked in an oven for 25 minutes at 200° C. and thereafter dried for 2.5 hours at 100° C. The specific volume of the products obtained was $1.8 \times 10^3$ m$^3$/kg; the water content was 4 wt.%. The products obtained were coated with a coating material as described in Example 1, such that the weight ratio of coating material to baked product was 1:3. The water content of the coated product was 14 wt.%. The coated products were deep-fried for 30 seconds at 180° C. The end-product contained 42 wt.% fat and retained its crispness for 6 minutes in soup of 75° C.

EXAMPLE 7

Preparation of a puff pastry snack according to the invention

A puff pastry was prepared from a dough consisting of:

1,000 g wheat flour, of which 14% water, 13% protein and 72% starch
500 g added water
50 g fat
10 g salt, which was rolled out and folded with 700 g puff pastry fat (16% water, 84% fat). The total water content of the dough was 33 wt.%; the total starch content was 32 wt.%. The puff pastry was rolled out to a thickness of 3 mm and divided into pieces of 25 mm×25 mm. The pieces were baked in an oven for 25 minutes at 200° C. and subsequently dried for 90 minutes at 100° C. The baked, dried products had a specific volume of $2.0 \times 10^{-3}$/kg and a moisture content of 4 wt.%.

The baked products were coated with a coating material as described in Example 5, such that the weight ratio of coating material to baked product is 1:3. The coated product had a water content of 16 wt.%. The product was subsequently deep-fried for 45 s at 160° C. The end-product had a crisp outside and a rather soft inside and a fat content of 34 wt.%. When exposed to the air, the products remained fresh longer than non-coated snacks.

EXAMPLE 8

A filled snack prepared according to the invention

A dough according to Example 3 was rolled out to a layer of 1.5 mm thickness, spread with a 2.0 mm layer of processed cheese and subsequently covered with a second layer of dough of 1.5 mm thickness. The layered product had a water content of 43 wt.% and a starch content of 31 wt.%.

The layered piece of dough was divided into pieces of 25 mm×25 mm. These pieces were baked in an electric oven for 25 minutes at 200° C. and thereafter dried for 00 minutes at 90° C. The baked products had a specific volume of $1.6 \times 10^{-3}$ m$^3$/kg and a moisture content of 6 wt.%.

The baked products were coated with a coating material from Example 5, such that the weight ratio of coating material to product was 1:3 The coated products had a water content of 18 wt.%. The coated products were deep-fried for 30 s at 180° C. The end-product had a fat content of 24.7 wt.%. When exposed to the air, the products remained fresh longer than non-coated products.

EXAMPLE 9

Preparation of croûtons by extrusion

A mixture of 1,000 g wheat flour, of which 13% protein, 12% water, 74% starch
360 g maize starch with a high content of amylose, of which 13% protein, 12% water, 74% starch
5 g glycerol monostearate
170 ml added water was extruded at a temperature of 100° C. and a pressure 40 bar through an extrusion opening, which had been selected such that a rod was formed having a diameter of 8 mm. The rod obtained was reduced to pieces of 5 mm×8 mm×8 mm. The extruded pieces had a specific volume of $2.1 \times 10^{-3}$ m$^3$/kg and a moisture content of 6 wt.%. The pieces were subsequently coated with a coating material as described in Example 1, such that the weight ratio of coating material to baked product was 1:3. The water content of the coated product was 16 wt.%. The coated products were deep-fried for 30 s at 180° C. The end-product contained 18 wt.% fat and retained its crispness for 6 minutes in soup of 75° C.

EXAMPLE 10

Preparation of croûtons with the aid of a microwave oven

A dough according to Example 5 was rolled out and divided into pieces of 8 mm×8 mm and heated for 10 minutes in a microwave oven (having an emissivity of 600 watt). The moisture content of the baked products was 6 wt.%, the specific volume $2.0 \times 10^{-3}$ m$^3$/kg.

The baked pieces obtained were coated with the coating material from Example 1. The weight ratio of coating material to baked pieces was 1:3. The water content of the coated product was 16 wt.%. The coated pieces were subsequently deep-fried for 25 s at 180° C. The product thus obtained contained 18 wt.% fat and retained its crispness for 5 minutes in soup of 75° C.

VOORBEELD 11

Preparation of croûtons with the aid of a microwave oven

A dough according to Example 3 was rolled out and divided into pieces of 8 mm×8 mm and baked for 20 minutes at 200° C. and thereafter dried for 90 minutes at 80° C. The specific volume of the baked products thus obtained was $2.0 \times 10^{-3}$ m$^3$/kg, the moisture content was 4 wt.%. The products thus obtained were coated with a coating material as described in Example 1. The weight ratio of coating material to baked product was 1:3. The water content of the coated product was 14 wt.%. The coated products were dried with the aid of a warm stream of air to a moisture content of 4 wt.%. The dried, coated products were subsequently heated in a combined hot air/microwave oven at a temperature of 200° C. and a microwave emissivity of 600 watt. The product thus obtained contained 14 wt.% fat and retained its crispness for 6 minutes in soup of 75° C.

EXAMPLE 12

Preparation of croûtons

A dough according to Example 3 was rolled out and divided into pieces of 8 mm×8 mm and baked in an electric oven for 20 minutes at 200° C. and thereafter dried for 90 minutes at 80° C. The specific volume of the baked products thus obtained was $2.1 \times 10^{-3}$ m³/kg, the moisture content was 3 wt.%.

The products thus obtained were coated with a coating material as described in Example. The weight ratio of coating material to baked product was 1:3. The water content of the coated product was 13 wt.%. The coated products were dried with the aid of a stream of hot air to a moisture content of 4 wt.%. The dried, coated products were subsequently baked for 10 minutes at 200° C. The product thus obtained contained 14 wt.% fat and retained its crispness for 6 minutes in soup of 75° C.

EXAMPLE 13

Preparation of croûtons

A dough according to Example 5 was rolled out and divided into pieces of 8 mm × 8 mm and heated for 8 minutes in a microwave oven (having an emissivity of 600 watt). The moisture content of the baked products was 6 wt.%, the specific volume $2.0 \times 10^{-3}$ m³/kg. The baked pieces obtained were coated with the coating material from Example 1. The weight ratio of coating material to baked pieces was 1:3. The water content of the coated product was 16 wt.%. The coated products were subsequently baked in a microwave oven (having an emissivity of 600 watt). The product thus obtained contained 14 wt.% fat and retained its crispness for 6 minutes in soup of 75° C.

EXAMPLE 14

A dough as described in Example 3 was rolled out, divided, baked and dried as described in this Example.

The products thus obtained were coated with different coating materials of the following composition:

100 g component X
100 g oil
3 g salt
0.3 g soy lecithin
20 g flour

The weight ratio of coating material to baked product was 1:3. The products were deep-fried for 25 s at 180° C. The croûtons obtained were compared as to quality when used in a hot, aqueous solution of 75° C. The results are given in Table A.

TABLE A

| | Component X | Quality |
|---|---|---|
| 1 | 15% chicken protein powder 85% water | + + |
| 2 | 12% milk protein 88% water | +/0 |
| 3 | 12% wheat protein 88% water | + |
| 4 | 12% Na-caseinate 88% water | + |
| 5 | Mixture of 50% component 1 and 50% component 2 | + |
| 6 | Mixture of 50% component 1 and 50% component 3 | + + |
| 7 | Mixture of 50% component 1 and 50% component 4 | + + |

TABLE A-continued

| | Component X | Quality |
|---|---|---|
| 8 | 7% pre-gelatinized wheat starch, 93% water | −/0 |
| 9 | 6% pre-gelatinized potato starch, 94% water | − |
| 10 | 100% water | − − |
| 11 | Comparative example without coating | − − − |

From this it appears that various film-forming agents rich in protein can improve the quality of the product considerably. Pre-gelatinized starches have a positive influence on the quality, although considerably less than film-forming agents rich in protein. The products without film-forming agents have an unacceptably poor quality, be it somewhat better than non-coated products.

We claim:

1. A process for preparing a coated foodstuff comprising the steps of:
   (a) preparing dough pieces;
   (b) backing the dough pieces, at least partially, to produce moisture-containing expanded dough pieces;
   (c) coating the expanded dough pieces with an edible, thermosetting, film forming material which under the influence of heat forms a moisture proof layer around the expanded dough pieces; and
   (d) heat-treating the expanded moisture-containing dough pieces in the presence of an edible oil, wherein the moisture content is sufficient to produce a film which lies around the pieces and prevents oil penetration thereto.

2. Process according to claim 1, further comprising the step of reducing the size of the expanded dough prior to coating.

3. Process according to claim 1, wherein the water content of the coated foodstuff is less than 25 wt.%.

4. Process according to claim 1, wherein the coated foodstuff is subsequently subjected to a heat treatment.

5. Process according to claim 1, wherein the expanded dough has a specific volume of $1.2 \times 10^{-3}$ m³/kg to $3.0 \times 10^{-3}$ m³/kg.

6. Process according to claim 1, wherein the edible film forming material is formed from a water-in-oil emulsion which comprises from 40 to 60 wt.% oil or fat, from 40 to 60 wt.% water, from 1 to 10 wt.% film forming material and up to not more than 5 wt.% emulsifiers, salt, flavoring materials and similar additives.

7. Process according to claim 1, wherein the edible film-forming material comprises 20-60 wt.% water, 5-35 wt.% flour, 1-10 wt.% film-forming material, 10-30 wt.% fat and up to 5 wt.% emulsifiers, salt, flavoring materials and similar additives.

8. Process according to claim 1, wherein the coated foodstuff has a volume of less than 8 cm³, preferably less than 4 cm³.

9. Process according to claim 4, wherein the heat treatment comprises a deep-frying treatment in an edible oil for 10 to 200 seconds at a temperature of 150° to 220° C.

* * * * *

UNITED STATES PATENT AND TRADEMARK OFFICE
CERTIFICATE OF CORRECTION

PATENT NO. : 4,935,251

DATED : June 19, 1990

INVENTOR(S) : Nicolaas J. F. D. Verhoef, et al

It is certified that error appears in the above-identified patent and that said Letters Patent is hereby corrected as shown below:

Col. 1, line 66, "backed" should read --baked--;
Col. 4, line 19, "when a batter or" should read --When a batter of--;
Col. 4, line 57, "EXAMPLE I" should read --EXAMPLE 1--;
Col. 4, line 68, "Broad" should read --Bread--;
Col. 6, line 14, after "38 wt.%" insert --fat--;
Col. 6, line 39, "what" should read --wheat--;
Col. 6, line 50, "ϵ" should read --s--;
Col. 7, line 58, "00 minutes" should read --90 minutes--;
Col. 8, line 42, "VOORBEELD" should read --EXAMPLE--;
Col. 9, line 4, after "Example" insert --1--; and
Col. 10, line 23, "backing" should read --baking--.

Signed and Sealed this

Twenty-fourth Day of December, 1991

*Attest:*

HARRY F. MANBECK, JR.

*Attesting Officer*  *Commissioner of Patents and Trademarks*